US009939073B2

(12) United States Patent
Workman

(10) Patent No.: US 9,939,073 B2
(45) Date of Patent: Apr. 10, 2018

(54) BREATHER CHECK VALVE

(71) Applicant: FlowTech Fueling, LLC, Moorcroft, WY (US)

(72) Inventor: Jeffrey D. Workman, Moorcroft, WY (US)

(73) Assignee: FlowTech Fueling, LLC, Moorcroft, WY (US)

( * ) Notice: Subject to any disclaimer, the term of this patent is extended or adjusted under 35 U.S.C. 154(b) by 34 days.

(21) Appl. No.: 15/015,370

(22) Filed: Feb. 4, 2016

(65) Prior Publication Data
US 2017/0227136 A1   Aug. 10, 2017

(51) Int. Cl.
*B60K 15/035* (2006.01)
*F16K 17/36* (2006.01)
*F16K 24/04* (2006.01)

(52) U.S. Cl.
CPC .......... *F16K 17/366* (2013.01); *B60K 15/035* (2013.01); *F16K 24/044* (2013.01); *Y10T 137/0874* (2015.04); *Y10T 137/86324* (2015.04)

(58) Field of Classification Search
CPC ................ Y10T 137/0874; Y10T 137/86324
See application file for complete search history.

(56) References Cited

U.S. PATENT DOCUMENTS

| 3,500,843 | A | * | 3/1970 | White | B60K 15/03519 |
| | | | | | 137/43 |
| 5,261,439 | A | * | 11/1993 | Harris | B60K 15/03519 |
| | | | | | 123/516 |
| RE34,518 | E | * | 1/1994 | Covert | B60K 15/03519 |
| | | | | | 137/588 |
| 5,582,198 | A | * | 12/1996 | Nagino | B60K 15/03519 |
| | | | | | 137/202 |
| 5,687,778 | A | * | 11/1997 | Harris | B60K 15/0406 |
| | | | | | 137/43 |
| 7,201,155 | B2 | * | 4/2007 | Mills | F02M 25/0854 |
| | | | | | 123/509 |
| 2006/0283501 | A1 | * | 12/2006 | Devall | B60K 15/03504 |
| | | | | | 137/43 |
| 2010/0282335 | A1 | * | 11/2010 | Mills | F16K 17/19 |
| | | | | | 137/202 |

* cited by examiner

Primary Examiner — R. K. Arundale
(74) Attorney, Agent, or Firm — Holland & Hart LLP

(57) ABSTRACT

A vent apparatus is described for providing filtered air intake and rollover protection for a fuel tank. The apparatus may include a housing configured to be coupled with the fuel tank, the housing including at least one air intake port and at least one air exhaust port. The apparatus may include an air intake filter disposed within the housing and configured to receive and filter air from the at least one air intake port. The apparatus may include a rollover protection valve disposed adjacent to the housing and configured to be located inside the fuel tank when the housing is coupled with the fuel tank, the rollover protection valve coupled with the at least one air exhaust port. The rollover protection valve may include a chamber and a plug configured to impede the flow of fuel from the fuel tank into the at least one air exhaust port.

14 Claims, 6 Drawing Sheets

BREATHER CHECK VALVE

FIELD

The present disclosure relates generally to an apparatus for protecting containers, such as fuel tanks on mobile equipment, against contamination and/or spill. More particularly, the present disclosure relates to a vent apparatus for providing filtered air intake and rollover protection for a fuel tank.

BACKGROUND

To rapidly fill containers, such as the fuel tanks on mobile equipment, liquids may be pumped under relatively high pressures into the containers. In many pieces of heavy equipment, such as mining equipment, fuel tanks may hold a significant amount of fuel, potentially resulting in a time consuming fueling operation. Given the size of fuel tanks on such heavy equipment, high pressures are often used to reduce filling times and return the equipment to service more quickly. In order to avoid damaging the fuel tanks by over-pressurizing, it may be necessary to allow air to exit the tank during the filling process. Similarly, when the engine of the mobile equipment is drawing fuel out of the fuel tank, it may be necessary to allow air to enter the tank to avoid creating a vacuum within the tank. Where air is entering the fuel tank from outside the container, it may be desirable to avoid particulate contamination of the fuel by filtering the air as it enters the tank.

Existing fueling apparatuses may provide an external air filter in order to avoid contaminating the fuel tank. Such external filters, however, may present difficulties in fuel tanks having space constraints within the mobile equipment. Accordingly, it may be desirable to provide filtering that is integrated with the fueling apparatus to avoid the need for extra space to accommodate the filter.

Where air is allowed to enter and exit the fuel tank, a risk may arise that, in the event of equipment rollover, the fuel may leak out of the air entry and exit points. Accordingly, it may be desirable to allow a fuel tank to be vented, while reducing the likelihood or amount of fuel spillage in the event of equipment rollover.

SUMMARY

The described features generally relate to one or more improved apparatuses for providing filtered air intake and rollover protection for a fuel tank. The vent apparatus may include a housing configured to be coupled with the fuel tank, the housing including at least one air intake port and at least one air exhaust port. The air intake port may be configured to intake air from outside the housing, while the air exhaust port may be configured to expel air received into the housing from the fuel tank to outside the housing. The vent apparatus may include an air intake filter disposed within the housing and configured to receive and filter air from the at least one air intake port. The vent apparatus may include a rollover protection valve disposed adjacent to the housing and configured to be located inside the fuel tank when the housing is coupled with the fuel tank, the rollover protection valve coupled with the at least one air exhaust port. The rollover protection valve may include a chamber and a plug configured to impede the flow of fuel from the fuel tank into the at least one air exhaust port.

Further scope of the applicability of the described systems and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

This description provides examples, and is not intended to limit the scope, applicability or configuration of the invention. Rather, the ensuing description will provide those skilled in the art with an enabling description for implementing embodiments of the invention. Various changes may be made in the function and arrangement of elements.

An apparatus is described for filtering air entering a fuel tank to avoid contamination of fuel contained therein, while also providing protection against fuel spillage in the event of the fuel tank tipping or rolling over. The described apparatus may be integrated with a flow control valve and the fuel tank itself, such that the entirety of the fuel filling, venting, and rollover protection system may be compact and self-contained.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

Figure 1:
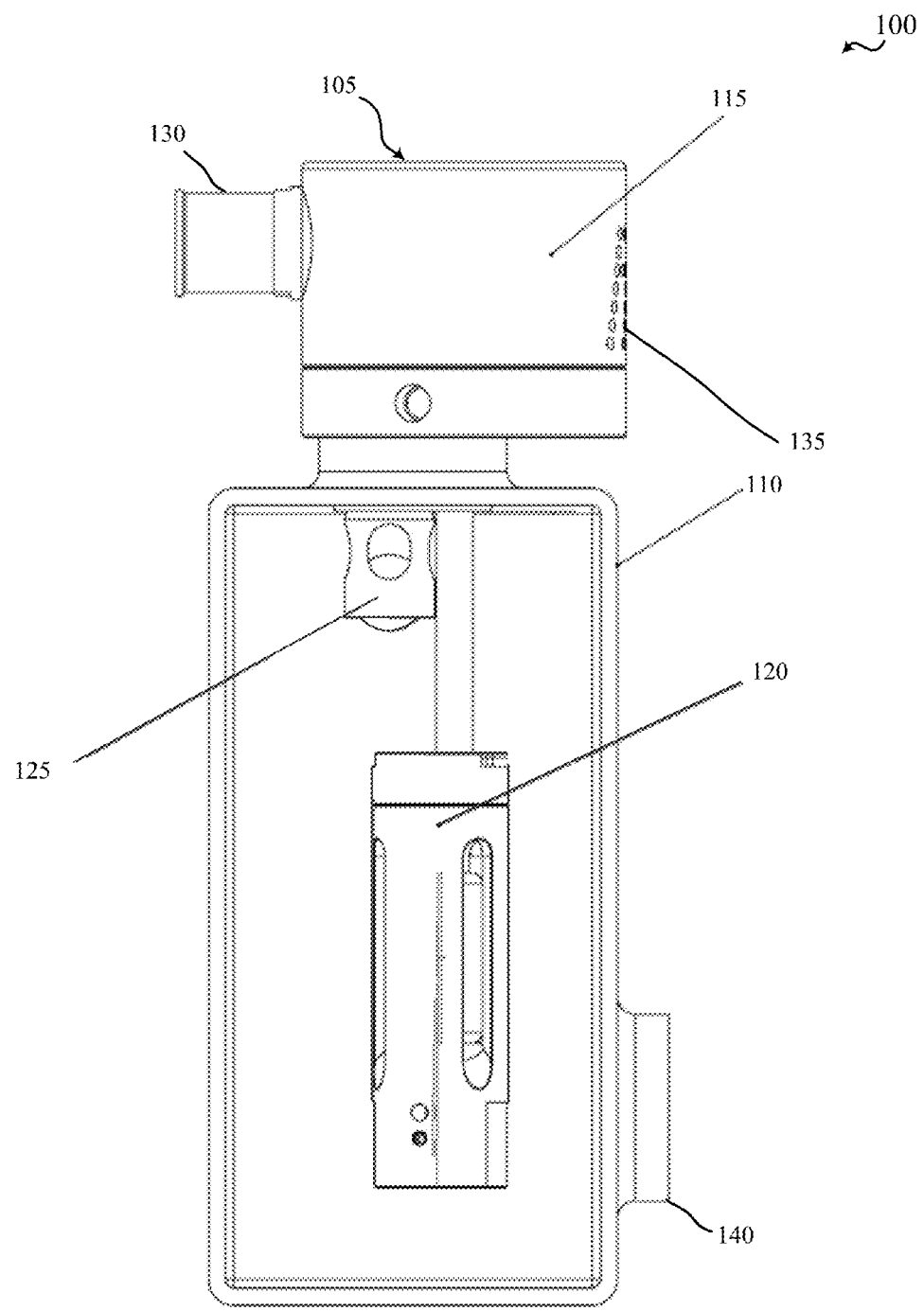
FIG. 1 is a side view of a vent apparatus and fuel tank including components configured according to various embodiments of the present disclosure.
Figure 2:
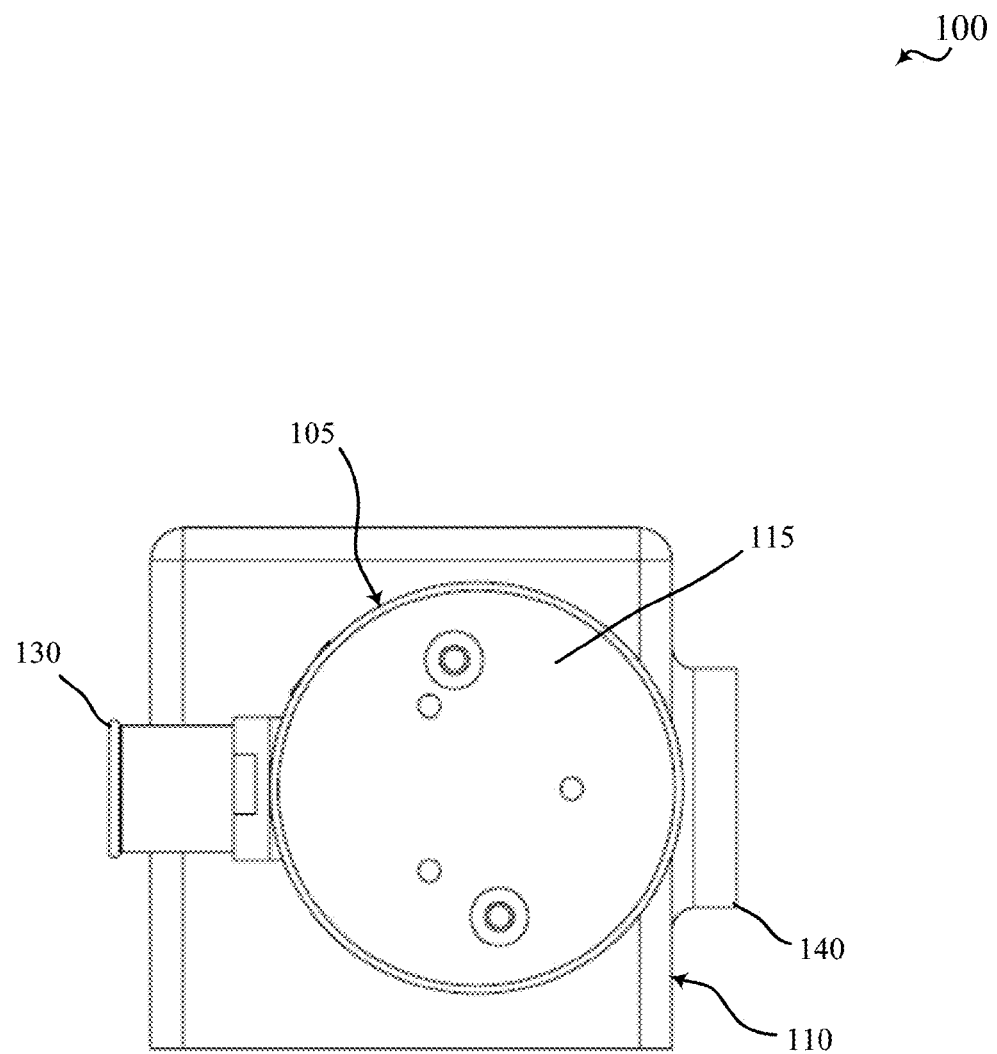
FIG. 2 is a top view of a vent apparatus and fuel tank including components configured according to various embodiments of the present disclosure.

Referring first to FIG. 1 and FIG. 2, a side view and top view, respectively, of a fuel tank filling and filtering system 100 is illustrated. The fuel tank filling and filtering system 100 may include a vent apparatus 105 that is coupled with a fuel tank 110. The vent apparatus 105 may include a vent housing 115, which may be configured to be coupled with the fuel tank 110, such as through a threaded coupling, for example. The vent housing 115 may be coupled with a fuel flow shut-off valve 120 and a rollover protection valve 125. The vent housing 115 may also include an air intake port 135 configured to intake air from outside the vent housing 115 and an air exhaust port 130 configured to expel air received into the vent housing 115 from the fuel tank 110 to outside the housing 115. A fuel inlet 140 may receive fuel into fuel tank 110.

It will be readily understood that the illustrations of the drawing figures are not to scale, and in many cases the fuel tank 110 may be a relatively large fuel tank on a piece of heavy machinery, and capable of holding many hundreds of gallons of fuel. Furthermore, although the examples described herein are directed to fuel tanks, it will be understood that the concepts described herein are also applicable to other types of liquid holding tanks. In some examples, the fuel flow shut-off value may be connected to the fuel inlet 140, and may operate to automatically shut off the flow of fuel into the fuel tank 110 when the fuel reaches a fill fuel level. In the example of FIG. 1, the air intake port 135 may include a number of intake holes that extend through a mounting cap assembly that forms all or a part of the vent housing 115. In other examples, the air intake port 135 may be a single hole, or may be coupled with an air intake tube.

Figure 3:
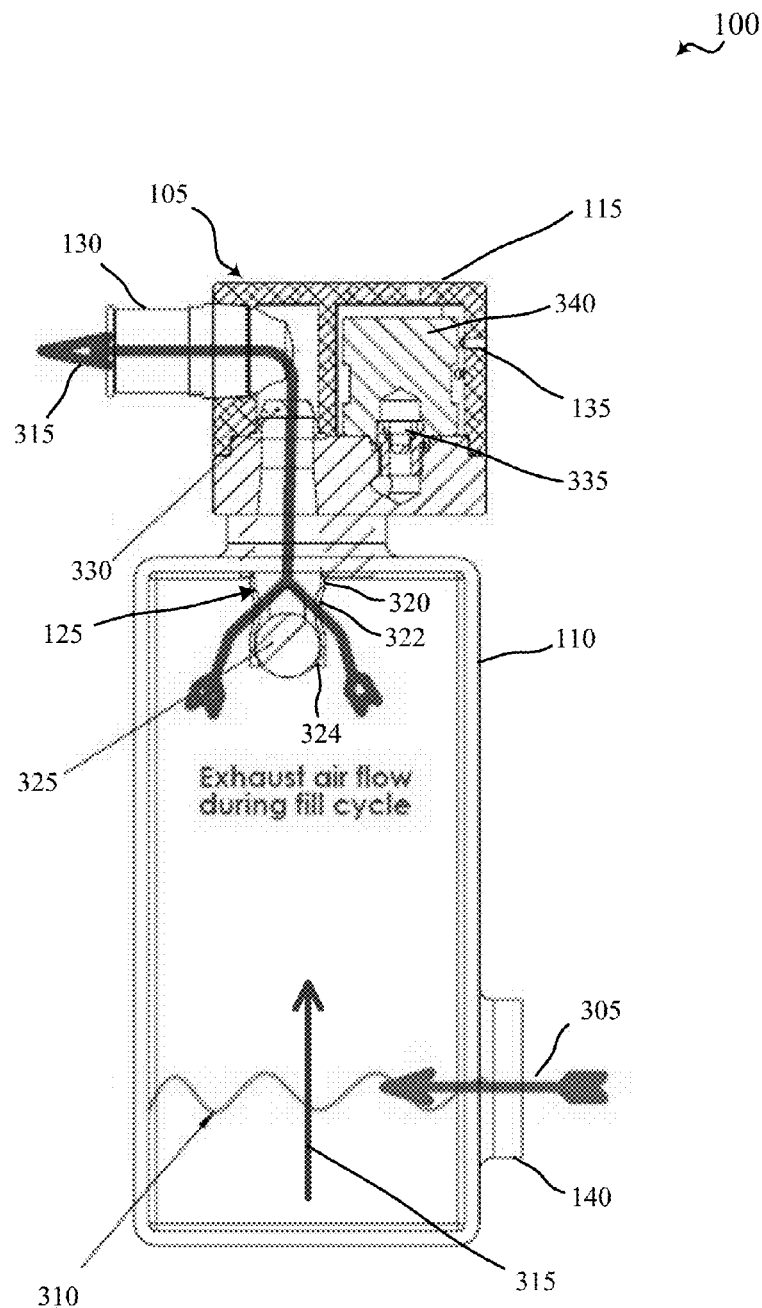
FIG. 3 is a cross-section view of a vent apparatus and fuel tank showing exhaust air flow during a fuel fill cycle according to various embodiments of the present disclosure.

FIG. 3 illustrates a cross-section view of the vent apparatus and fuel tank, and shows exhaust air flow during a fuel fill cycle according to various embodiments of the present disclosure. As indicated above, when fuel is added to fuel tank 110, as indicated at arrow 305 of FIG. 3, a fuel level 310 within the tank 110 will rise, as indicated at arrow 315. As the fuel level 310 rises air that is within fuel tank 110 may be vented in order to prevent the fuel tank 110 from becoming over-pressurized. In some cases, the fuel inlet 140 may be relatively large, allowing a relatively large fuel supply line to provide fuel at a high flow rate. Such a high flow rate may be desirable in order to fill the fuel tank 110 relatively quickly. In some examples, the fuel tank 110 may provide fuel for a piece of heavy machinery, such as a mining truck. By refueling such a piece of machinery quickly, the machinery may be returned to service following refueling faster, thus helping to generate increased revenue. Therefore, in such equipment, it may be necessary to have a relatively large air exhaust port 130. As indicated at arrow 315, exhaust air from fuel tank 110, during fuel filling operations, may travel through rollover protection valve 125 and through air exhaust port 130.

The rollover protection valve 125, according to some embodiments, may include a chamber and a plug 325 configured to impede the flow of fuel from the fuel tank 110 into the air exhaust port 130. In the example of FIG. 3, the chamber of the rollover protection valve 125 may be formed from a shaft 320 having a distal end located away from the air exhaust port 130 and a proximal end located closer or adjacent to the air exhaust port 130. The plug 325 is disposed within the shaft 320 and may move relative to the shaft 320 between the distal end and the proximal end of the shaft 320. Such movement may impede or prevent fuel from within the fuel tank 110 from freely flowing out of the fuel tank 110 and through the air exhaust port 130 in the event of a rollover of the machinery that has the fuel tank 110. The operation of the rollover protection valve will be described in more detail below with reference to FIG. 5. The plug 325, in some examples, may be a metal ball that may move by force of gravity between the distal end and the proximal end of the shaft 320. The shaft 320, in such examples may include a shoulder 324 positioned at the distal end of the shaft 320 configured to retain the plug 325 within the shaft 320. The shaft 320, in some examples, also may have another shoulder at the proximal end of the shaft configured to retain the plug 325 within the shaft 320 when the fuel tank is moved from the upright position. In other examples, the shaft 320 may be tapered at the proximal end of the shaft 320 which may retain plug 325 within the shaft. The exhaust air may flow through the shaft 320 through one or more apertures 322 that are configured to allow the exhaust air to flow through shaft 320 and air exhaust port 130 when the plug 325 is positioned at the distal end of the shaft 320.

An air exhaust port check valve 330, in this example, is located between rollover protection valve 125 and air exhaust port 130. In some examples, the air exhaust port check valve 330 may be a cross-slit valve molded in a closed position and that may be pulled open as a result of lower air pressure outside of the fuel tank 110 than the air pressure within the fuel tank 110. Thus, the air exhaust port check valve 330 may allow one-way airflow between the fuel tank 110 and the air exhaust port 130. Furthermore, as indicated above, in some cases it may be desirable to filter air that enters the fuel tank 110 through air intake port 135. In some embodiments an air intake filter 340 may be located between air intake port 135 and the air intake check valve 335. In some examples, the air intake check valve 335 may be a cross-slit valve molded in a closed position and that may be pulled open as a result of lower air pressure within the fuel tank 110 than the air pressure outside of the fuel tank 110. Thus, the air intake check valve 335 may allow one-way airflow into the fuel tank 110 from the air intake filter 340 and air intake port 135.

Figure 4:
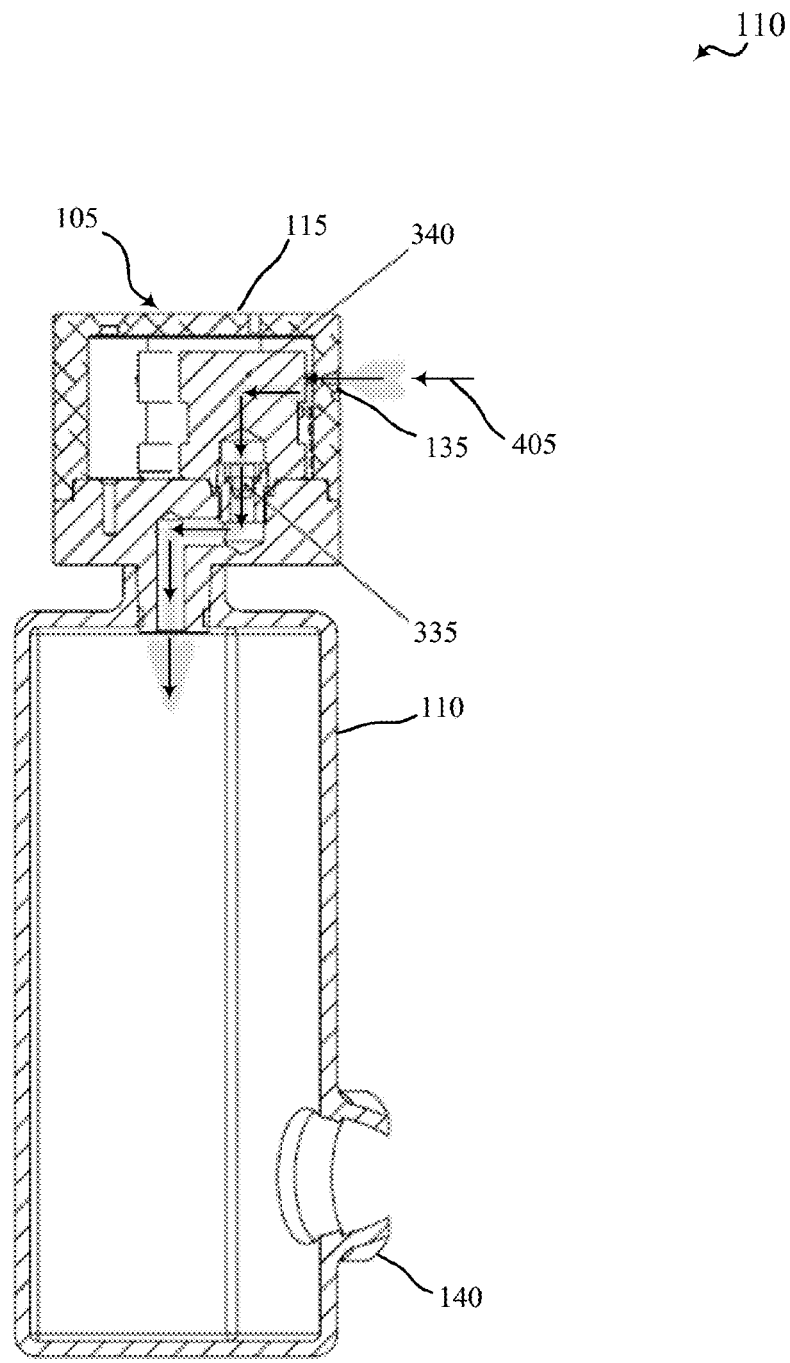
FIG. 4 is a side view, partially in cross-section, of a vent apparatus and fuel tank showing vent air flow as fuel is consumed according to various embodiments of the present disclosure.

FIG. 4 illustrates a cross-section view of the vent apparatus and fuel tank, and shows vent air flow as fuel is consumed according to various embodiments of the present disclosure. As indicated above, when fuel is removed from fuel tank 110, vent air may enter into the tank through air intake port 135, air intake filter 340, and air intake check valve 335, as indicated by arrows 405 in FIG. 4.

Figure 5:
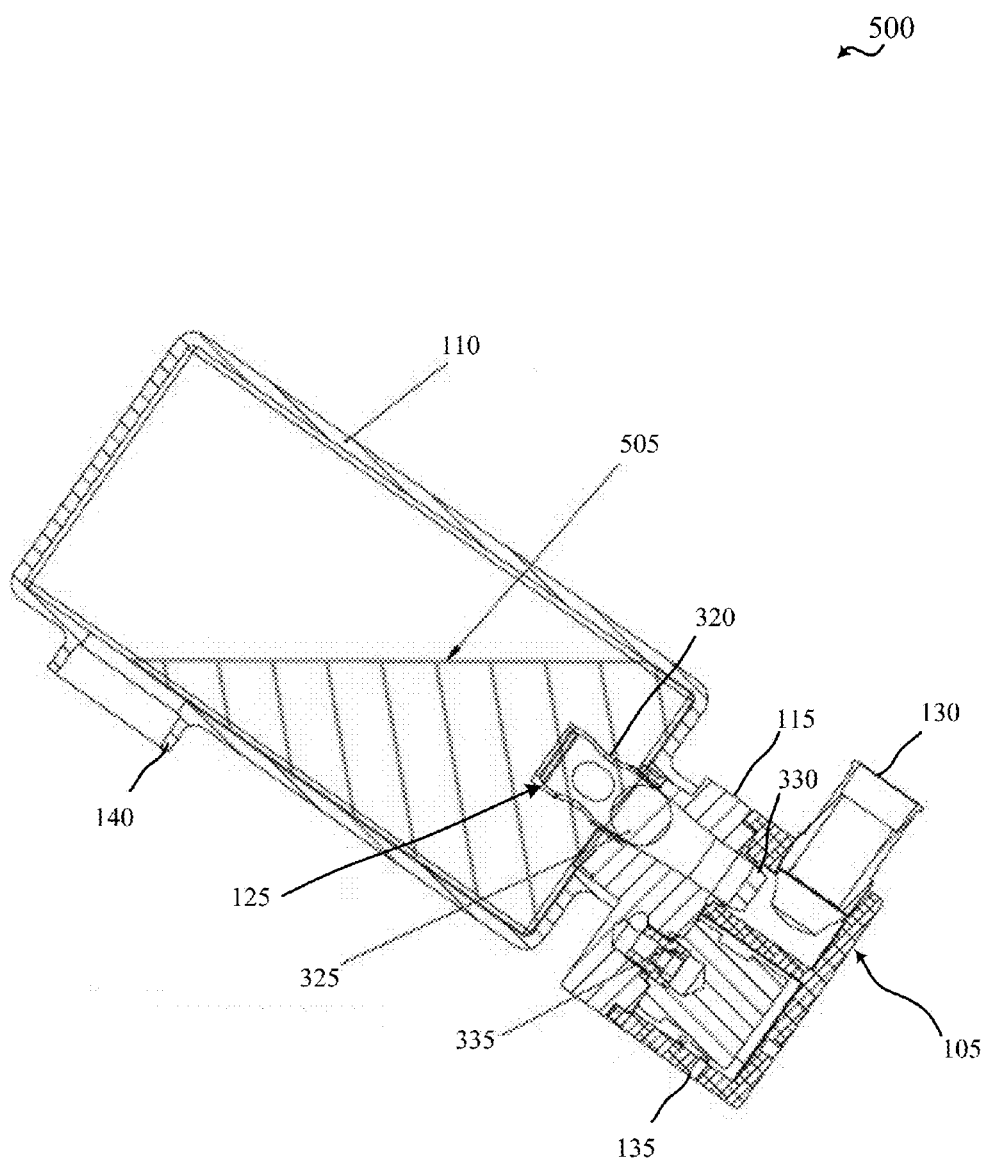
FIG. 5 is a cross-section view of a vent apparatus and fuel tank showing a rollover protection valve operation in the event of a vehicle rollover according to various embodiments of the present disclosure.

FIG. 5 illustrates a cross-section view 500 of the vent apparatus and fuel tank showing a rollover protection valve operation in the event of a vehicle rollover according to various embodiments of the present disclosure. In this example, fuel tank 110 is upset, such that the vent apparatus 105 is below a fuel level 505 of the fuel tank 110. Such an occurrence may occur, as indicated above if a vehicle rolls over. In such an event, in the absence of rollover protection valve 125, fuel could exit the tank via the air exhaust port check valve 330 and air exhaust port 130. The rollover protection valve 125, in some embodiments, provides that the plug 325 will remain at the distal end of the shaft 320 when the fuel tank 110 is in an upright position due, at least in part, to a pull of gravity on the plug 325, as indicated in FIG. 3. The plug 325 may then move from the distal end of the shaft 320 to the proximal end of the shaft 320 when the fuel tank 110 is moved from the upright position, as indicated in FIG. 5. The plug 325 may thus substantially slow, or even stop in some cases, the flow of fuel from the fuel tank 110 into the air exhaust port 130 when the plug 325 is positioned at the proximal end of the shaft 320. In some cases, the plug 325 may be sealingly pressed into position at the proximal end of the shaft 320 by the fuel in the inverted fuel tank 110. In such a manner, the rollover protection valve 125 may prevent large quantities of fuel from leaking in the event of a vehicle rollover.

Figure 6:
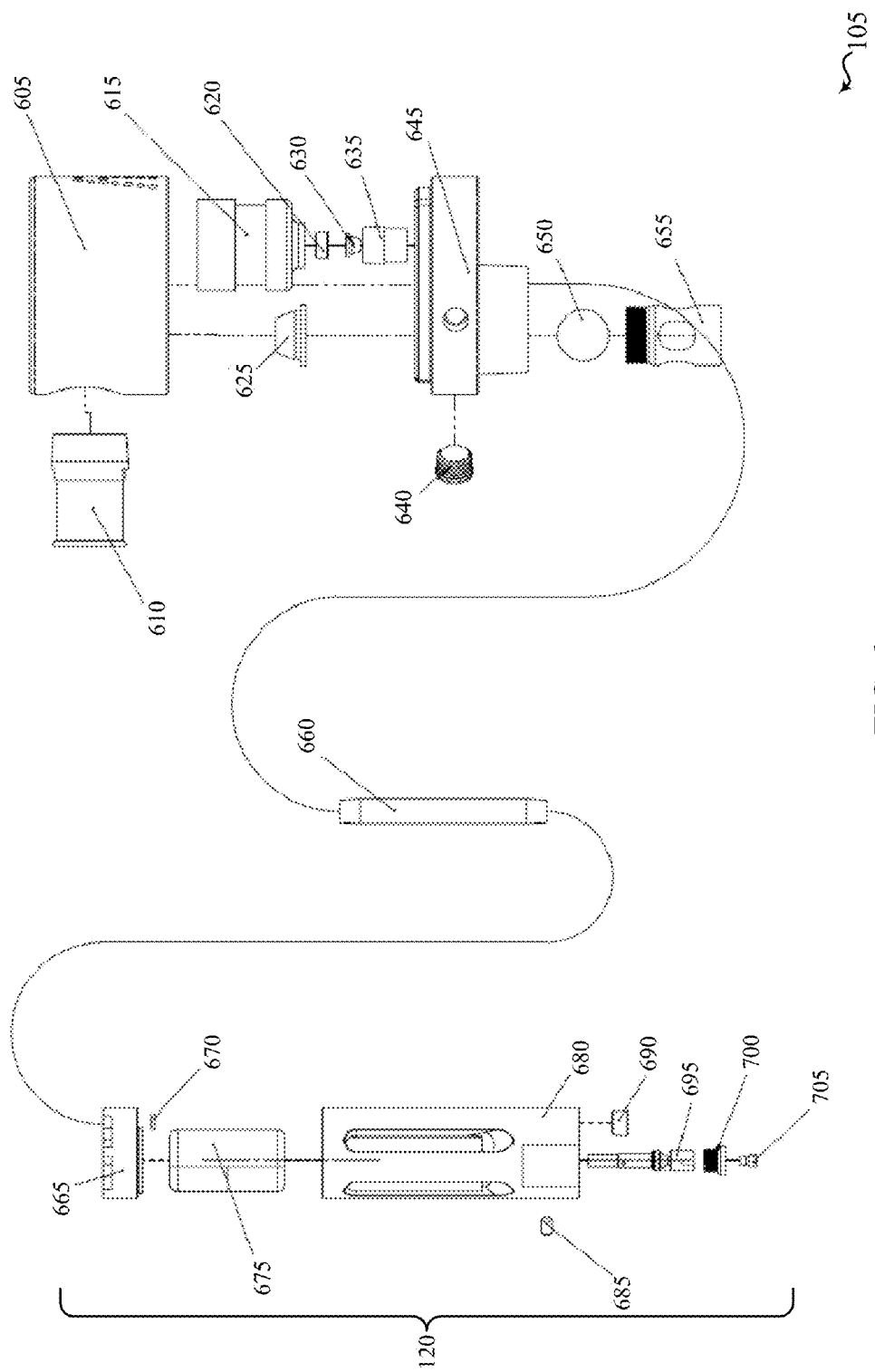
FIG. 6 is an exploded view of components of a vent apparatus according to various embodiments of the present disclosure.

FIG. 6 illustrates an exploded view of components of a vent apparatus 105 according to various embodiments of the present disclosure. In this embodiment, the vent apparatus 105 may be assembled from a number of different components. The components may be coupled to one another according to suitable techniques for making such connections, such as through threaded connections, welded connections, barbed connections, push-to-connect connections, dry disconnect connections, and/or compression fittings, for example. The components of vent apparatus 105 may be made of brass, stainless steel, galvanized steel, aluminum, rubber, plastic, or other suitable materials, or combinations thereof. In some embodiments, the materials of different components may be selected based on the exposure of the component to stress or other external forces, environmental conditions, materials that may contact the component, or combinations thereof. In some embodiments, materials of the components may be selected to resist corrosion, and withstand relatively high levels of pressure and wear.

In the example of FIG. 6, the vent apparatus 105 may include a mounting cap cover 605, that may have an opening to receive an exhaust port 610. The exhaust port 610 of this embodiment includes a hose barb fitting that may be inserted into the opening of mounting cap cover 605. Within the mounting cap cover 605 is filter/breather 615, which may be formed from suitable materials for such a filter, such as a pleated paper filter. A check valve 630 may be fitted with a threaded adapter 635, and mounted on mounting cap body 645. an exhaust port check valve 625 may also be mounted on mounting cap body 645. The mounting cap cover 605 may be coupled with mounting cap body 645, such as through a threaded connection, and one or more holes may be provided in mounting cap cover 605 to provide an air inlet port. An O-ring plug 640 may be inserted into mounting cap body 645, in this example, which may plug a port that may be used to provide fuel to fuel flow shut-off valve 120. A rollover protection shaft 655 and ball 650 may be coupled with a bottom of mounting cap body 645.

Fuel flow shut-off valve 120, in the example of FIG. 6, may be coupled with the bottom of mounting cap body 645 through a nipple 660, the length of which may be selected to provide the fuel flow shut-off valve 120 with a fuel level within a fuel tank at which the tank will be considered to be full. Fuel flow shut-off valve 120 may include a valve cap 665, coupled via an O-ring 670 to valve body 680. Within valve body 680 is float 675. Threaded plugs 685 and 690 may be inserted into valve body 680 in this example. A spool 695 may be coupled with the float 675, and an O-ring plug 700 and drain jet 705 may be inserted into the valve body 680 under spool 695. The operation of fuel flow shut-off valve 120 is described in detail in co-pending patent application Ser. No. 14/187,944, filed on Feb. 24, 2014, and entitled "Float Apparatus," the entire disclosure of which is incorporated herein by reference.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A vent apparatus for providing filtered air intake and rollover protection for a fuel tank, comprising:
   a housing configured to be coupled with the fuel tank, the housing comprising at least one air intake port configured to intake air from outside the housing, and the housing further comprising at least one air exhaust port configured to expel air received into the housing from the fuel tank to outside the housing and an air intake valve;
   an air intake filter disposed within the housing and configured to receive and filter air from the at least one air intake port, wherein the air intake valve is disposed between the at least one air intake port and the air intake filter; and
   a rollover protection valve disposed adjacent to the housing and configured to be located inside the fuel tank when the housing is coupled with the fuel tank, the rollover protection valve coupled with the at least one air exhaust port, wherein the rollover protection valve comprises a chamber and a plug configured to impede the flow of fuel from the fuel tank into the at least one air exhaust port.

2. The vent apparatus of claim 1, wherein the chamber comprises a shaft, the shaft comprising a distal end located away from the at least one air exhaust port and a proximal end adjacent the at least one air exhaust port.

3. The vent apparatus of claim 2, wherein the plug is disposed within the shaft and is configured to move relative to the shaft between the distal end of the shaft and the proximal end of the shaft.

4. The vent apparatus of claim 3, wherein the plug is configured to remain at the distal end of the shaft when the fuel tank is in an upright position due, at least in part, to a pull of gravity on the plug.

5. The vent apparatus of claim 4, wherein the plug is configured to move from the distal end of the shaft to the proximal end of the shaft when the fuel tank is moved from the upright position.

6. The vent apparatus of claim 5, wherein the plug is configured to impede the flow of fuel from the fuel tank into the at least one air exhaust port when the plug is positioned at the proximal end of the shaft.

7. The vent apparatus of claim 5, wherein the shaft further comprises a first shoulder positioned at the distal end of the shaft, the first shoulder configured to retain the plug within the shaft.

8. The vent apparatus of claim 7, wherein the shaft further comprises a second shoulder positioned at the proximal end of the shaft, the second shoulder configured to retain the plug within the shaft when the fuel tank is moved from the upright position.

9. The vent apparatus of claim 3, wherein the shaft further comprises at least one aperture, wherein the at least one aperture is configured to allow air to enter the at least one air exhaust port when the plug is positioned at the distal end of the shaft.

10. The vent apparatus of claim 1, wherein the air intake valve is configured to allow one-way airflow into the air intake filter from the at least one air intake port.

11. The vent apparatus of claim 1, wherein the housing further comprises an air exhaust valve disposed between the at least one air exhaust port and an air exhaust outlet, wherein the air exhaust outlet is positioned on an outside surface of the housing and is configured to couple the air exhaust port with the outside of the housing.

12. The vent apparatus of claim 11, wherein the air exhaust valve is configured to allow one-way airflow between the fuel tank and the air exhaust outlet.

13. The vent apparatus of claim 1, wherein the housing further comprises a threaded connection, and wherein the rollover protection valve is coupled with the housing with the threaded connection.

14. The vent apparatus of claim 1, wherein the housing is further coupled with a float valve apparatus, wherein the float valve apparatus is configured to regulate a level of fuel within the fuel tank.

* * * * *